Patented Jan. 16, 1923.

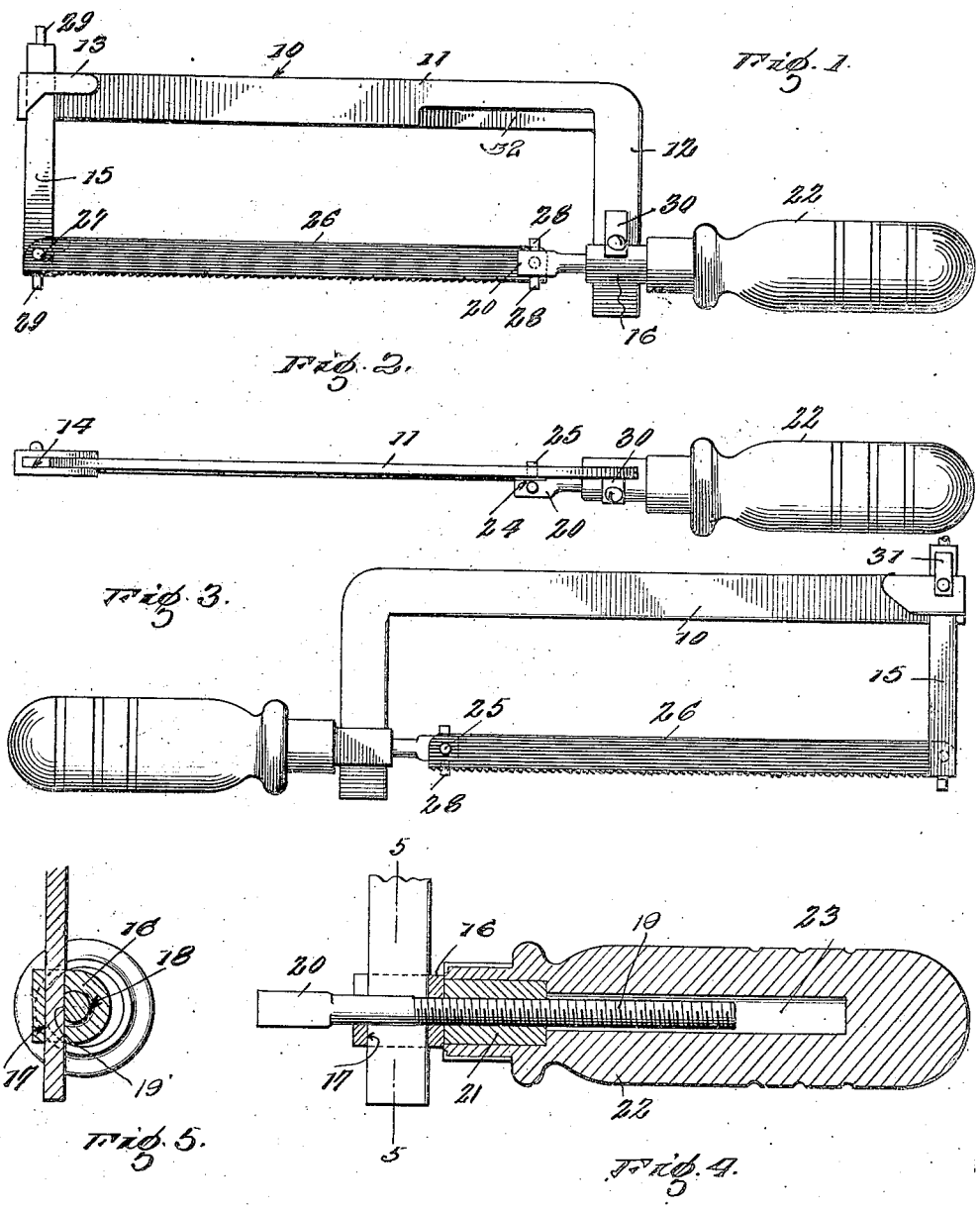

1,442,609

UNITED STATES PATENT OFFICE.

ALEXANDER GREIG, OF NEW YORK, N. Y.

HACK-SAW FRAME.

Application filed January 18, 1922. Serial No. 530,111.

*To all whom it may concern:*

Be it known that I, ALEXANDER GREIG, a citizen of the United States, residing at New York city, in the county of New York and State of New York, have invented certain new and useful Improvements in Hack-Saw Frames, of which the following is a specification.

This invention has relation to hacksaw frames, and has for an object to provide a frame which consists of separable parts, adjustably connected together to hold the saw blade, whereby machine parts, or the like which are inaccessible to an operator by ordinary hacksaw frames may be readily reached by this invention, owing to its construction, enabling the parts to be dissembled, the blade placed in a position for operation upon the part, and the parts of the frame reassembled to support the blade.

Another object of the invention is to provide a hacksaw frame in which the blade is adjustable toward and away from the frame, thus enabling the frame to be introduced into confined spaces around a machine to operate upon a part which could not be reached by means of a rigid frame of the conventional type.

In addition to the foregoing this invention comprehends improvements in the details of construction and arrangement on parts to be hereinafter described and particularly set forth in the appended claims.

In the accompanying drawings in which similar and corresponding parts are designated by the same characters of reference throughout the several views in which they appear:

Figure 1 is a view in side elevation of a hacksaw frame constructed in accordance with my invention.

Figure 2 is a view of the same in top plan.

Figure 3 is a view of the frame in side elevation taken from the reverse side of figure.

Figure 4 is a detail view enlarged and in section of the handle of the frame; and Figure 5 is a detail section taken on the line 5—5 of Figure 4.

With reference to the drawings, 10 indicates an angular member or bar forming part of the frame and consisting of a long side 11 which is the beam member, and a short side 12 formed at right angles to the beam 11 forming the arm of the frame. A U-shaped stirrup 13 is secured at its terminals to the end of the beam 11 leaving an opening 14 between the end of the beam 11 in the inner side of the stirrup. A straight bar 15 is inserted in said opening, thus disposing said bar in parallel relation to the side 12 of the frame. A block 16 is provided having a channel 17 to receive the end of the side 12 and said block is also formed with a circular opening 18 to receive the smooth end of a threaded rod 19, said smooth end of the rod being formed with a head 20 which is oblong in cross section as shown. The smooth or flattened end portion 19′ of the rod 19 bears against the adjacent face of the arm or short side 12 of the frame when the block 16 is in position so as to permit the rod to slide against this face of the arm and to prevent the rod from turning in the adjustment of the said blade to position, as hereinafter described. The threaded portion of the rod enters a nut 21 embodied in a handle 22, the latter having a deep recess 23 to receive the rod. One side of the head 20 is cut away providing a recess 24 to a depth equal to the thickness of a saw blade. A pin 25 is fixed in the head and extends from said recess to enter the opening at one end of a saw blade 26, the opening at the other end of the blade receiving a pin 27 extending from the side of the bar 15. It will be noted from Figure 2 that owing to the provision of the recess 24 and the fact that the face of the bar 15 is flush with the face of the beam 11 the blade is located out of the plane of the portion 11 of the frame. I also provide pins 28 projecting from the sides of the head 20 in opposite directions and at right angles to the pin 25. A pin 29 also projects from each end of the bar 15. A pair of spring fingers are provided, one finger 30 being mounted on the block 16 to engage the arm 12 and the other finger 31 being mounted on the stirrup 13 to engage the bar 15. These parts are thus held frictionally against relative movement when the frame is not under strain.

To tension the blade the handle 22 is rotated relative to the frame, which action feeds the threaded rod into the handle. The strain thus applied to the blade and frame ensures the retention of the parts of the latter in any adjusted position. The handle is rotated in a reverse direction to loosen the blade and to permit adjustment of the frame. As shown in the drawing, the frame is arranged for ordinary use. When an occasion arises where the blade is too far from the beam 11 to permit the frame to be entered in an opening, for instance of a machine part, the handle may be loosened slightly and the blade moved toward the beam 11, the block 16 being moved along the side 12 of the frame and the bar 15 inserted further into the stirrup 13. A recess 32 is formed in the side of the beam 11 to receive the pin 25. It will be noted that the depth of a cut may be limited by engagement of the inner side of the beam 11 with the work. In this manner a number of cuts of uniform depth may be made. In the event that the opening of the machine part is too small to receive the frame as in the example last given, which would be the case where a keyway slot is to be cut in a pulley, the entire frame may be dissembled, the blade introduced into the hub opening of the pulley, and the frame reassembled so that the beam 11 may operate between the spokes of the pulley. Owing to the varied number of adjustments possible with this frame many parts of an assembled machine may be reached by the blade which would otherwise be entirely inaccessible by means of the ordinary type of rigid frame. It will also be noted that the blade may be connected at one end to one of the pins 28 at its other end to one of the pins 29, thus disposing the blade at a position at right angles to its usual position. This expedient may be useful occasionally. Other uses and advantages will readily occur to those skilled in the art.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A hacksaw frame including a U-shaped frame portion, means mounted on said frame to support a saw blade for adjustment toward and away from the beam of the frame, said means being adapted to support the blade in a position out of the plane of said beam so that the blade may be adjusted close enough to overlap said beam, whereby the latter may form a means to limit the depth of a cut by engagement with the work, and means to tension the blade.

2. In a hacksaw, a frame, devices slidably connected with the frame for engagement with a saw blade for adjusting the said blade to various positions, in one of which the said blade overlaps the beam member of the frame whereby this portion of the frame may be used as a gauge to determine the depth of the cut made by the saw, and means for tensioning the said blade in the said devices.

3. A hacksaw frame comprising a beam and an arm at right angles thereto, a bar slidably mounted at the end of the beam, with corresponding faces of the beam and bar being substantially flush with one another, a head slidably mounted on the said arm of the frame, means associated with the said head and bar for engaging a saw blade and supporting the same in a plane parallel to the plane of the beam of the frame but not coincident therewith, whereby the said blade is adjustable to a position in which it overlaps a part of the beam, and means for tensioning the said saw blade.

4. A hack saw frame comprising a beam and an arm at right angles thereto, a bar slidably mounted at the end of the beam, means carried by the bar for engaging one end of a saw blade, a block slidably mounted on the said arm, a rod adjustable to position in the said block and adapted to engage the opposite end of a saw blade so that the saw blade when in position lies in a plane parallel with the beam but not coincident therewith, whereby the said blade is adjustable to a position in which it overlaps a part of the beam, and means for adjusting the said rod to position longitudinally of the said blade to secure the same in place.

5. A hack saw frame comprising a beam and an arm at right angles thereto, a bar slidable at right angles to the said beam at the end thereof, a pin carried by the said bar and adapted to engage one end of a saw blade, a block slidable to position on the said arm, a rod passing through the said block and adjustable to position therein, a head at the end of the said rod, a pin carried by the said head and adapted to engage the opposite end of a saw blade so that the saw blade when in position lies in a plane parallel to the said beam but not coincident therewith, and means for adjusting the rod to position to apply tension to the said blade.

6. A hack saw frame comprising a beam, an arm at right angles thereto, a bar slidably mounted at right angles at the end of the said beam, the faces of the corresponding sides of the beam, its arm and the said bar lying in the same plane, a pin at the end of the bar adapted to engage one end of a saw, a block slidably mounted on the arm of the frame, a rod passing through and longitudinally adjustable in the said block, a head at the end of the rod having a face lying in a plane parallel to the plane of the corresponding faces of the beam, arm and bar, a pin extending from the said head adapted to engage the opposite end of a saw blade so that the saw blade may be adjusted to position to overlap the beam, and means for aplying tension to the said blade by adjusting the rod to position.

7. A hack saw frame comprising a beam, an arm at right angles thereto, a bar slidably mounted at right angles at the end of the said beam, the faces of the corresponding sides of the beam, its arm and the said bar lying in the same plane, a pin at the end of the bar adapted to engage one end of a saw, a block slidably mounted on the arm of the frame, a rod passing through and longitudinally adjustable in the said block, a head at the end of the rod having a face lying in a plane parallel to the plane of the corresponding faces of the beam, arm and bar, a pin extending from the said head adapted to engage the opposite end of a saw blade so that the saw blade may be adjusted to position to overlap the beam, the beam of the frame being provided with a recess to receive the pin in the head on the rod, and a handle for receiving the screw threaded end of the rod for moving the same longitudinally to apply tension to the said blade.

In testimony whereof I affix my signature in presence of two witnesses.

ALEXANDER GREIG. [L. S.]

Witnesses:
EGBERT MILLS,
CARRIE L. STRAUSS.